(12) United States Patent
Gniadek

(10) Patent No.: US 9,897,766 B2
(45) Date of Patent: Feb. 20, 2018

(54) BAYONET LOCK MPO CONNECTOR

(71) Applicant: Senko Advanced Components, Inc., Marlborough, MA (US)

(72) Inventor: Jeffrey Gniadek, Northbridge, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/790,077

(22) Filed: Jul. 2, 2015

(65) Prior Publication Data

US 2017/0003457 A1 Jan. 5, 2017

(51) Int. Cl.
*G02B 6/38* (2006.01)

(52) U.S. Cl.
CPC ......... *G02B 6/3891* (2013.01); *G02B 6/3821* (2013.01)

(58) Field of Classification Search
CPC .................................. G02B 6/38; G02B 6/386
USPC .......................................................... 385/78
See application file for complete search history.

(56) References Cited

U.S. PATENT DOCUMENTS

| | | | | |
|---|---|---|---|---|
| 4,844,570 A * | 7/1989 | Tanabe | ................. | G02B 6/3825 385/55 |
| 5,074,637 A * | 12/1991 | Rink | .................... | H01R 13/625 385/56 |
| 5,280,552 A * | 1/1994 | Yokoi | .................. | G02B 6/3825 385/69 |
| 6,186,670 B1 * | 2/2001 | Austin | ................. | G02B 6/3825 385/55 |
| 7,241,056 B1 * | 7/2007 | Kuffel | .................. | G02B 6/3806 385/60 |
| 7,654,748 B2 * | 2/2010 | Kuffel et al. | ................... | 385/60 |
| 8,556,520 B2 * | 10/2013 | Elenbaas | .............. | G02B 6/3847 385/53 |
| 2001/0010741 A1 * | 8/2001 | Hizuka | ................ | G02B 6/3825 385/55 |
| 2003/0007739 A1 | 1/2003 | Perry et al. | | |
| 2003/0063867 A1 * | 4/2003 | McDonald | ........... | G02B 6/3869 385/78 |
| 2003/0147598 A1 * | 8/2003 | McPhee | ................ | G02B 6/3843 385/78 |
| 2003/0161586 A1 * | 8/2003 | Hirabayashi | ......... | G02B 6/3869 385/78 |

(Continued)

FOREIGN PATENT DOCUMENTS

DE 19901473 A1 7/2000

OTHER PUBLICATIONS

"SC/LC/FC/ST/MU/D4/DIN Fiber Optic Connectors," Ark Communication Co.,Ltd, Oct. 21, 2014, Shenzhen, China, https://web.archive.org/web/20141021222819/http://www.ark-optical.com/product-1-1-optic-fiber-connector-en/14296.

(Continued)

*Primary Examiner* — Kaveh C Kianni
(74) *Attorney, Agent, or Firm* — Pepper Hamilton LLP

(57) ABSTRACT

Optical fiber connectors for MT/MPO type ferrule assemblies are disclosed, having an overall connector length less than about 37 mm, for example, an overall length of about 18.5 mm. In one embodiment, a connector comprises a ferrule assembly, and a housing coupled to the ferrule assembly and configured to couple to an adapter corresponding to the ferrule assembly. The connector further includes a lock coupled to the housing and configured to rotate so as to lock and unlock the housing from said adapter.

20 Claims, 21 Drawing Sheets

(56) References Cited

U.S. PATENT DOCUMENTS

| | | | |
|---|---|---|---|
| 2004/0047566 A1* | 3/2004 | McDonald et al. ............ | 385/78 |
| 2005/0213897 A1* | 9/2005 | Palmer ................. | G02B 6/3846 |
| | | | 385/95 |
| 2008/0026647 A1* | 1/2008 | Boehnlein .......... | G02B 23/2476 |
| | | | 439/882 |
| 2009/0148101 A1* | 6/2009 | Lu ........................ | G02B 6/3816 |
| | | | 385/56 |
| 2010/0215322 A1 | 8/2010 | Matsumoto et al. | |
| 2015/0177467 A1* | 6/2015 | Gniadek .............. | G02B 6/3894 |
| | | | 385/58 |

OTHER PUBLICATIONS

International Search Report and Written Opinion dated Sep. 22, 2016 from related International Application No. PCT/US16/39599, International Filing Date Jun. 27, 2016.

* cited by examiner

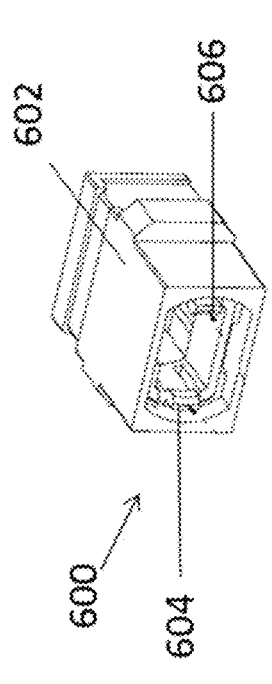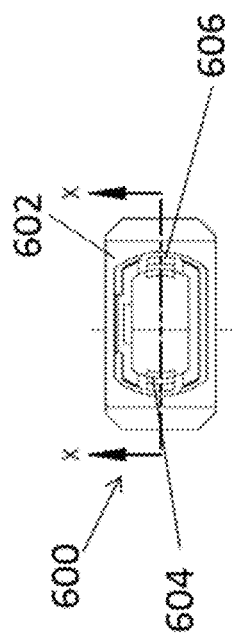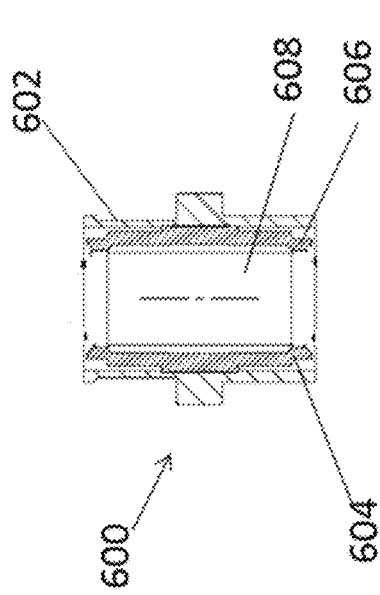
FIG. 6 (PRIOR ART)
FIG. 7 (PRIOR ART)
FIG. 8 (PRIOR ART)

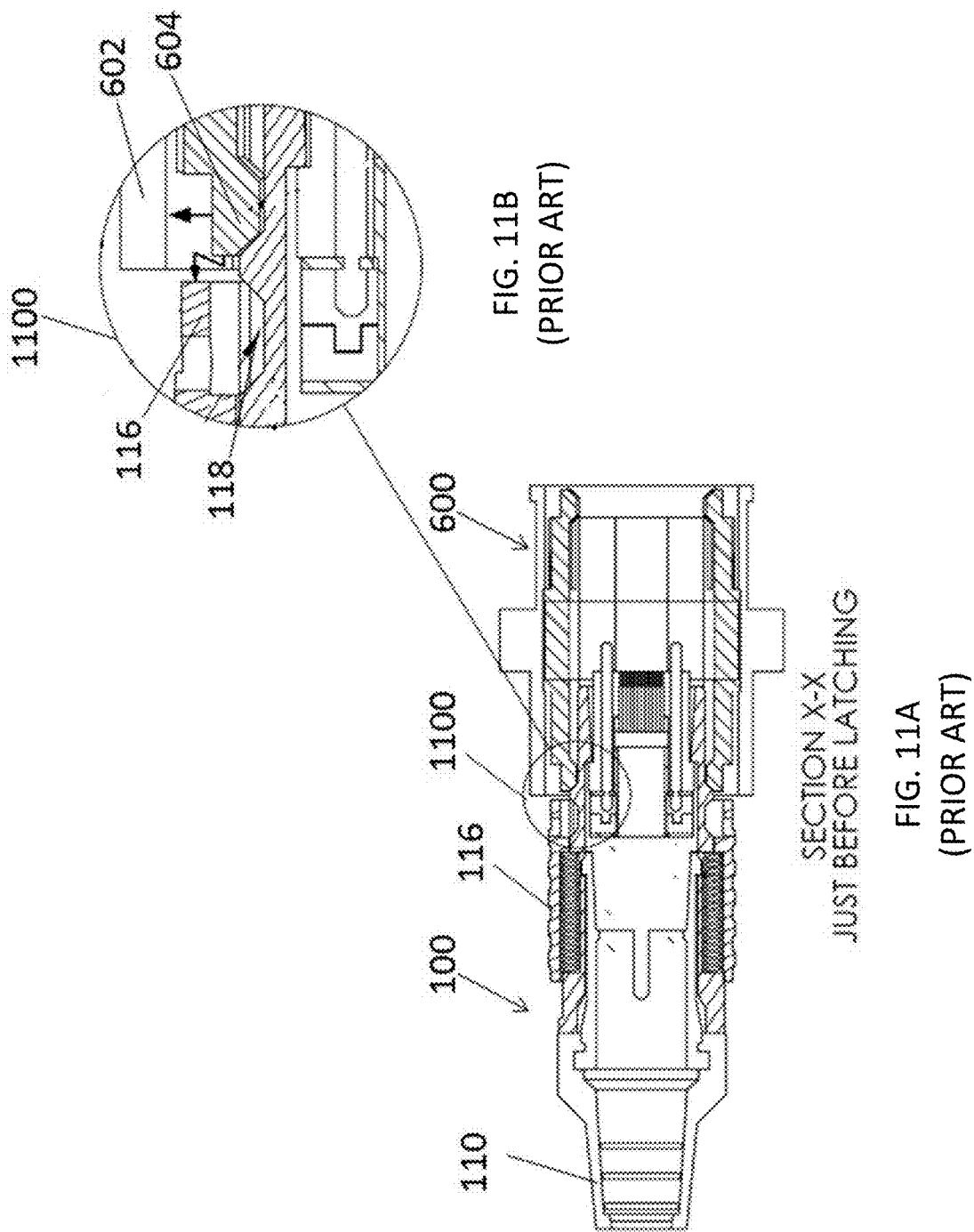

SECTION X-X
LATCHED CONDITION

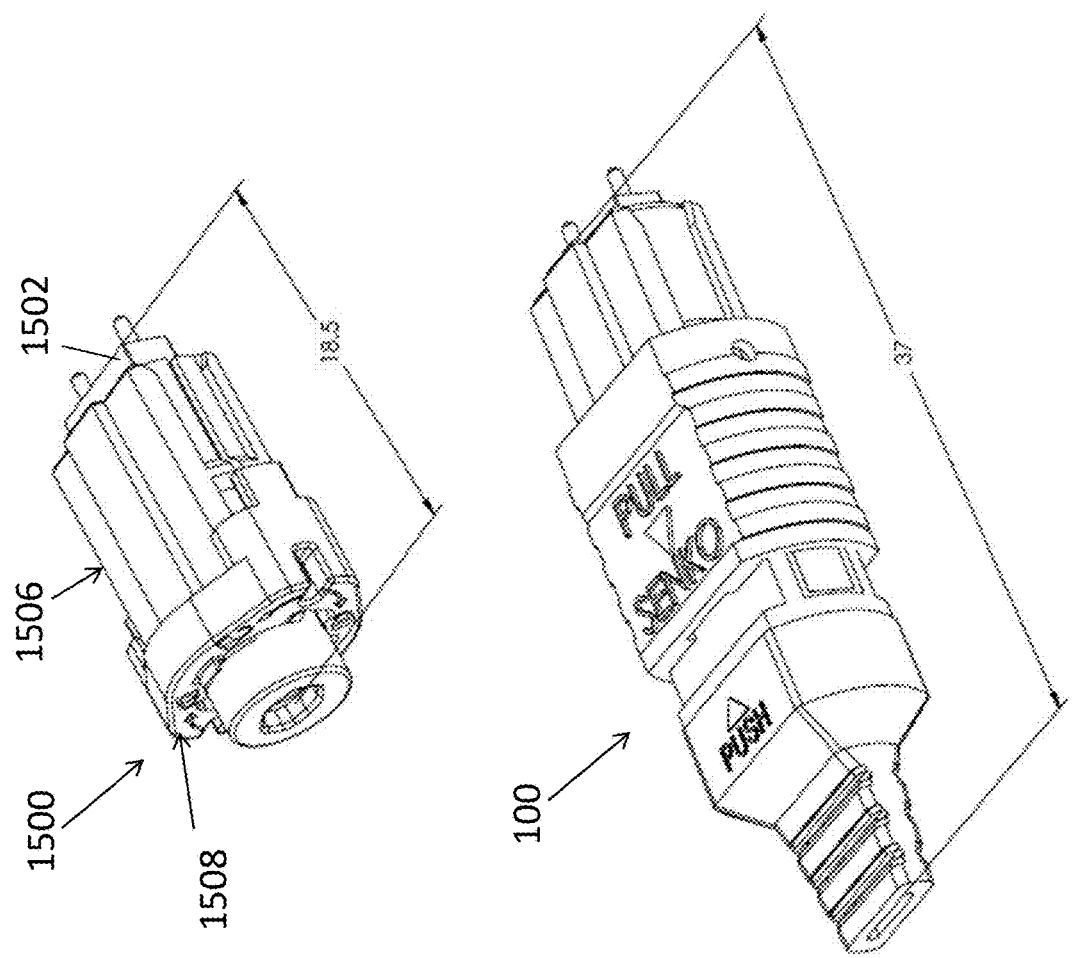

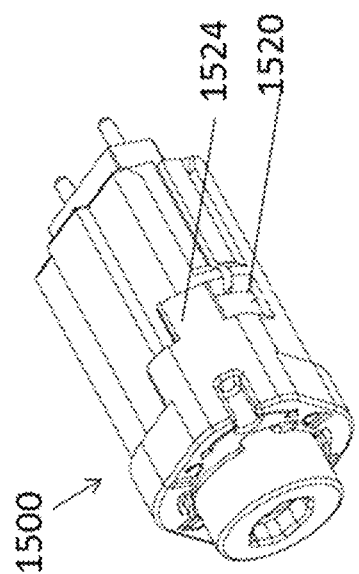
FIG. 25B UNLOCKED
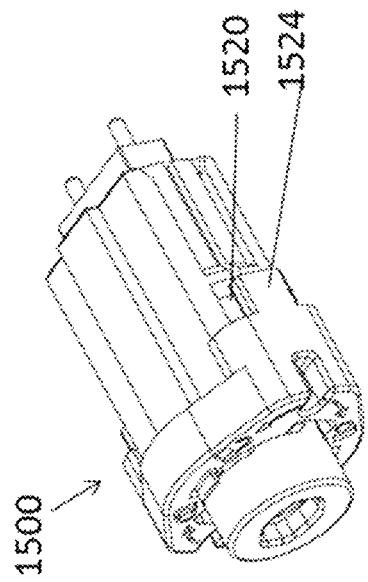
FIG. 26B LOCKED
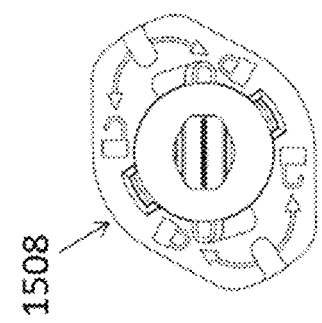
FIG. 25A UNLOCKED
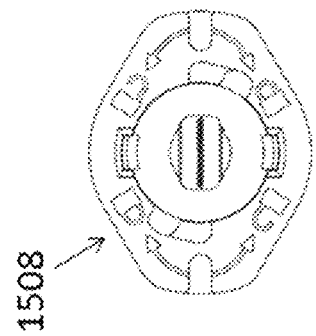
FIG. 26A LOCKED

LOCKED

BAYONET LOCK MPO CONNECTOR

BACKGROUND

The present disclosure relates generally to optical fiber connectors and systems, and specifically to MPO (Multi-fiber Push On) type optical fiber connectors having a compact design.

Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

An MPO connector is a multi-fiber connector defined by industry standards. A conventional MPO connector has many constituent parts and a push/pull locking and unlocking mechanism, resulting in a relatively long connector design that wastes too much space, and which may not be sufficiently small for use in certain applications. Moreover, conventional MPO connectors are composed of many constituent parts, increasing the cost of materials and labor, as well as the complexity of assembly. Accordingly, there is a need for MPO type optical fiber connectors that have a more compact design than conventional MPO connectors.

SUMMARY

Embodiments disclosed herein address the aforementioned shortcomings of conventional MPO connectors by providing MPO connectors having a lock, such as a bayonet lock or a locking ring, and less constituent parts, resulting in a shorter length than conventional MPO connectors. For example, in one embodiment, an MPO connector may have a length less than about 37 mm. For example, the length of the MPO connector may be about 18.5 mm. By contrast, a conventional MPO connector typically has a length of about 37 mm. Other advantages of embodiments disclosed herein include lower cost of materials and assembly, and compatibility with conventional MPO adapters that are in use in various applications. Furthermore, various embodiments of MPO connectors disclosed herein are compatible with MPO type ferrule assemblies that are in use in various applications. Thus, various embodiments disclosed herein are backwards compatible with conventional MPO assemblies and adapters.

According to one aspect, there is disclosed a connector comprising a ferrule assembly, a housing coupled to the ferrule assembly and configured to couple to an adapter corresponding to the ferrule assembly, and a lock coupled to the housing and configured to rotate so as to lock and unlock the housing from said adapter. The ferrule assembly may be an MT/MPO ferrule assembly or an MPO ferrule assembly. The lock may be a ring configured to rotate about the housing. In some embodiments, the lock may be a bayonet lock.

In various embodiments, the connector may have a single housing. That is, the housing coupled to the ferrule assembly may be the only housing of said connector. The housing may include a front portion and a rear portion, and the front portion may be configured to receive the ferrule assembly. The lock may be coupled to the rear portion of the housing. In some embodiments, the housing may include a cylindrical portion. The cylindrical portion may be the rear portion of the housing. The bayonet lock may be disposed about the cylindrical portion. In some embodiments, the lock may include at least one flexing tab configured to snap into a respective groove of the housing so as to couple the lock to the housing. The housing may include a stop configured to limit rotation of the lock.

In some embodiments, the connector may further comprise a ferrule spring disposed within the housing. The housing may include at least one catch and the ferrule assembly may be secured to the housing between the ferrule spring and the at least one catch. The housing may comprise a plurality of inclined surfaces configured to facilitate coupling of the ferrule assembly to the housing. In some embodiments, the housing may include a plurality of slits configured to allow flexing of the housing.

In various embodiments, the housing may include at least one recess configured to receive a respective catch of an adapter. The lock may include at least one tab configured to cover the respective catch of said adapter disposed in the at least one recess of the housing when the lock is in a locked position. The at least one tab may be configured to uncover the respective catch of said adapter disposed in the at least one recess of the housing when the lock is in an unlocked position, to allow decoupling the housing from the adapter.

Various embodiments of connectors disclosed herein may have a length less than about 37 mm. Some embodiments may have a length less than or equal to about 18.5 mm. For example, one embodiment of a connector may have a length of about 18.5 mm. In various embodiments wherein the housing is coupled to an adapter, a portion of the connector protruding from said adapter may have a length less than about 26 mm. In some embodiments, the housing may be coupled to an adapter, and a portion of the connector protruding from said adapter may have a length less than or equal to about 7.5 mm. For example, the length of the portion of the connector protruding from an adapter coupled thereto may be about 7.5 mm.

According to another aspect, there is disclosed a connector comprising a housing configured to receive a ferrule assembly, and to couple to an adapter corresponding to said ferrule assembly, and a lock coupled to the housing and configured to rotate around the housing so as to lock and unlock the housing from said adapter. The housing may be configured to receive an MT/MPO ferrule assembly or an MPO ferrule assembly, and to couple to an MPO adapter. The lock may be a bayonet lock. In some embodiments, the length of the connector may be less than or equal to about 18.5 mm. Various features described in conjunction with other embodiments may further be included in this embodiment.

BRIEF DESCRIPTION OF THE FIGURES

FIG. 6 is a perspective view of a prior art MPO adapter that is compatible with various embodiments of connectors according to aspects of the present disclosure;

FIG. 7 is a front view of the prior art MPO adapter of FIG. 6;

FIG. 8 is a cross-sectional view of the prior art MPO adapter of FIG. 6;

FIGS. 11A and 11B are cross-sectional views of the prior art MPO connector and adapter of FIG. 10 just before latching;

FIG. 16 is a perspective view showing an assembled form of the embodiment of the connector of FIG. 15, having a length of 18.5 mm according to aspects of the present disclosure;

FIG. 17 is a perspective view of the prior art MPO connector of FIG. 2, having a length of 37 mm in comparison with the embodiment of FIG. 16 which has a length of 18.5 mm;

FIG. 25A is a front view of a lock in an unlocked position according to aspects of the present disclosure;

FIG. 25B is a perspective view of the connector of FIG. 16 in an unlocked position, showing a recess in the housing being uncovered by a tab of the lock in the unlocked position according to aspects of the present disclosure;

FIG. 26A is a front view of the lock of FIG. 25A in a locked position according to aspects of the present disclosure;

FIG. 26B is a perspective view of the connector of FIG. 25B in a locked position, showing a recess in the housing being covered by a tab of the lock in the locked position according to aspects of the present disclosure;

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. For connection of cables together or with other fiber optic devices, the terminal ends of a cable may include a connector. A connector may include a housing structure configured to interact with and connect with an adapter.

An MPO connector is a multi-fiber connector defined by industry standards. One brand of an MPO connector is an MPT connector. A conventional MPO connector has many constituent parts and a push/pull locking and unlocking mechanism, resulting in a relatively long connector, increased cost of materials and labor, as well as the complexity of assembly.

Figure 1:
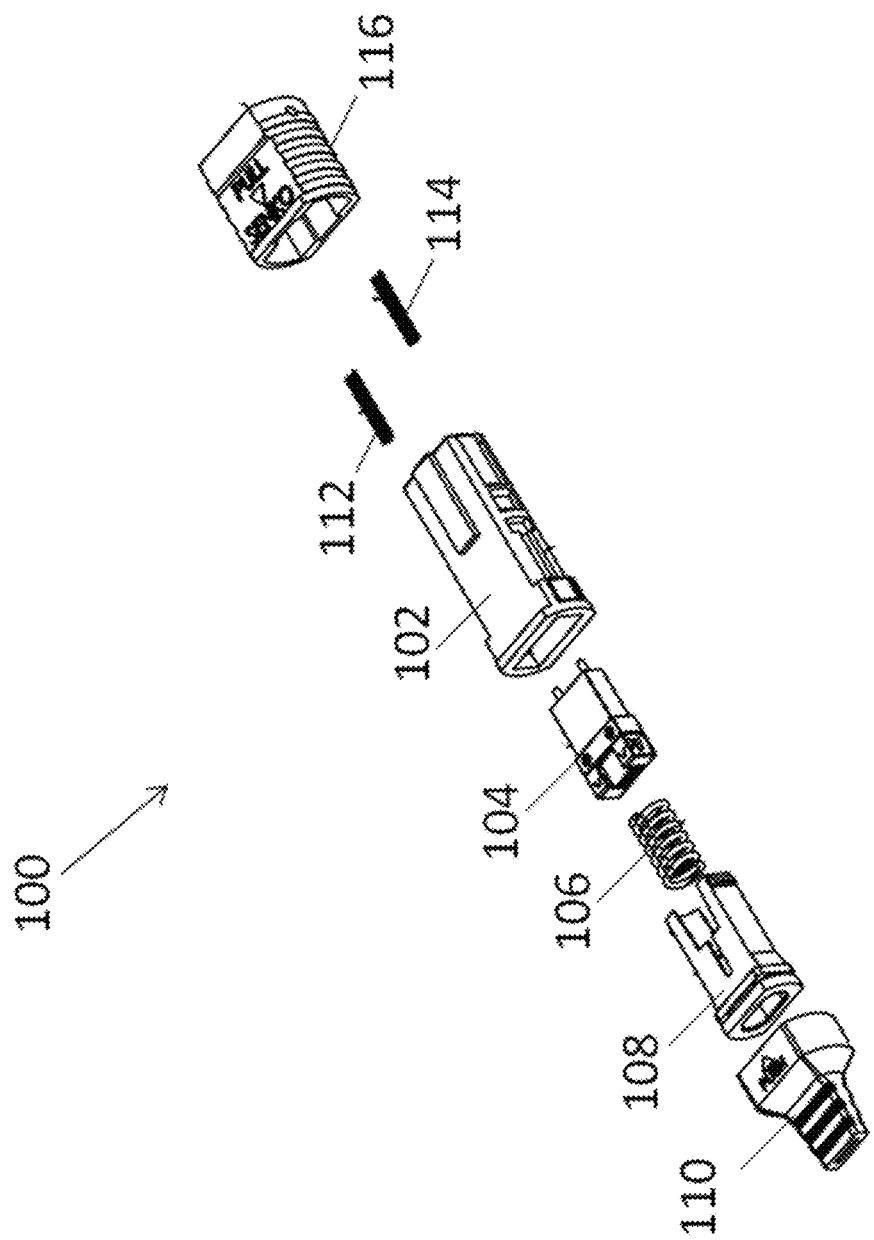
FIG. 1 is an exploded view of a prior art MPO connector.

FIG. 1 shows an exploded view of a prior art MPO connector 100. The connector 100 is an assembly having eight parts. The connector 100 includes a main body or inner housing 102, a ferrule assembly 104, a ferrule spring 106, a spring retainer/pusher 108, a strain relief, two outer housing springs 112 and 114, and a sliding outer housing 116. Conventional MPO connectors use multiple housing components, such as the inner housing and the outer housing of the connector 100.

Figure 2:
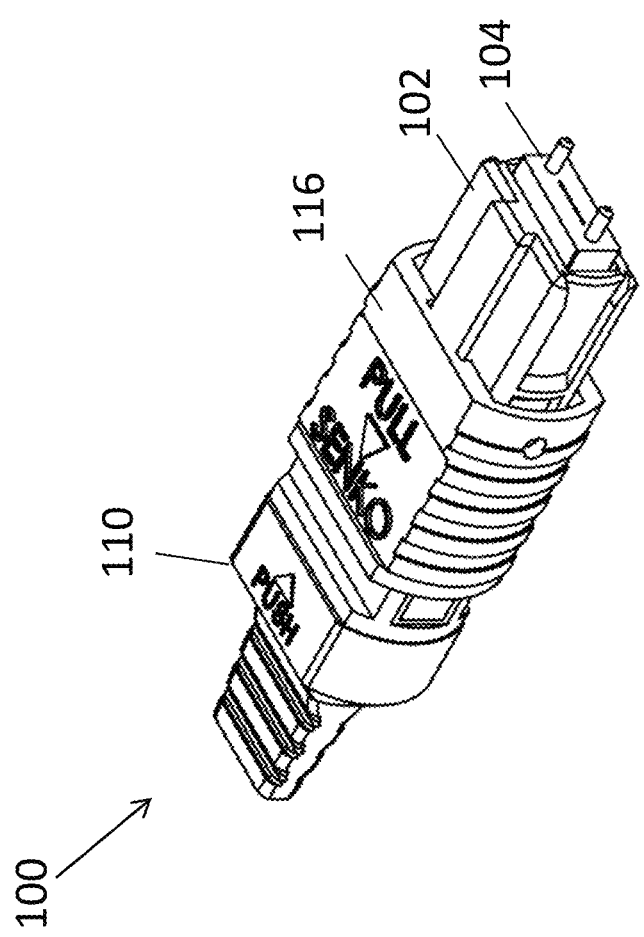
FIG. 2 is a perspective view of the assembled prior art MPO connector of FIG. 1.
Figure 3:
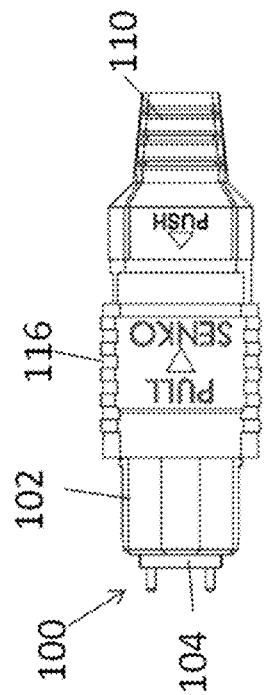
FIG. 3 is a top view of the prior art MPO connector of FIG. 2.
Figure 4:
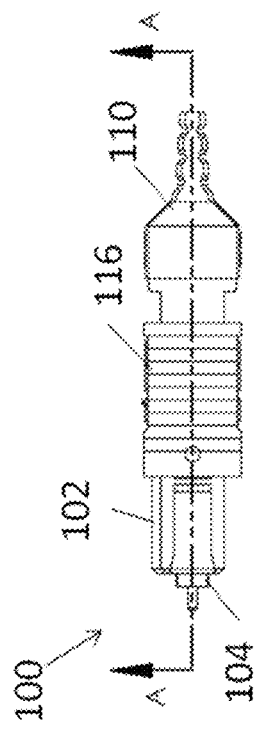
FIG. 4 is a side view of the prior art MPO connector of FIG. 2.

A perspective view of the assembled prior art MPO connector of FIG. 1 is shown in FIG. 2. The ferrule assembly 104 disposed within the inner housing 102, which is further disposed within the outer housing 116, and coupled to the strain relief 110. In the assembled form shown in FIG. 2, the connector 100 has an overall length of about 37 mm. FIG. 3 is a top view of the prior art MPO connector 100 of FIG. 2. FIG. 4 is a side view of the prior art MPO connector 100 of FIG. 2.

Figure 5:
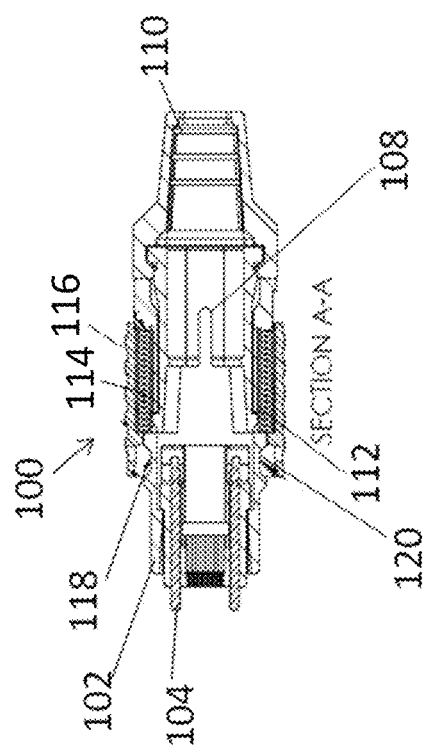
FIG. 5 is a cross-sectional view of the prior art MPO connector of FIG. 2.

FIG. 5 shows a cross-sectional view of the prior art MPO connector 100, along section A-A shown in FIG. 4. FIG. 5 further shows the outer springs 112 and 114, configured to allow sliding of the outer housing 116. The inner housing 102 includes recesses 118 and 120 for engaging with the catches of an adapter.

A perspective view of a prior art MPO adapter 600 is shown in FIG. 6. The adapter includes an adapter housing 602, and adapter catches 604 and 606. FIG. 7 is a front view of the prior art MPO adapter of FIG. 6, showing the catches 604 and 606. FIG. 8 is a cross-sectional view of the prior art MPO adapter 600 along section X-X of FIG. 7, showing the catches 604 and 606, and a channel 608 configured to receive at least a portion of a ferrule assembly within the housing 602.

Figure 9:
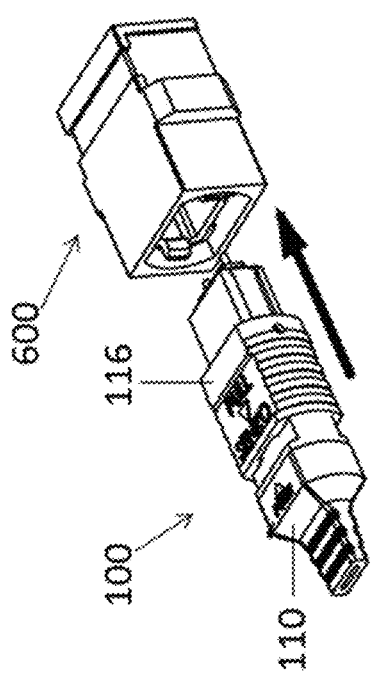
FIG. 9 is a perspective view showing the prior art MPO connector of FIG. 2 being inserted into the prior art adapter of FIG. 6.

The prior art MPO connector 100 may be inserted into the adapter 600 by pushing the strain relief 110, as shown in FIG. 9. Conventional MPO connectors, such as the connector 100, use both the strain relief and the sliding outer housing for latching to and unlatching from the adapter 600. Specifically, the MPO connector 100 is pushed using the strain relief 110 to latch the connector into the adapter and the outer housing 116 is pulled or retracted to unlatch the connector from the adapter. These components, as well as the many constituent parts of the MPO adapter as shown in FIG. 1 are necessary for locking and unlocking the MPO connector and the adapter. Moreover, the design of a conventional MPO connector dictates that these components be arranged adjacent to one another, thereby resulting in a relatively long length of the conventional MPO connector. For example, the length of the connector 100 is about 37 mm.

Figure 10:
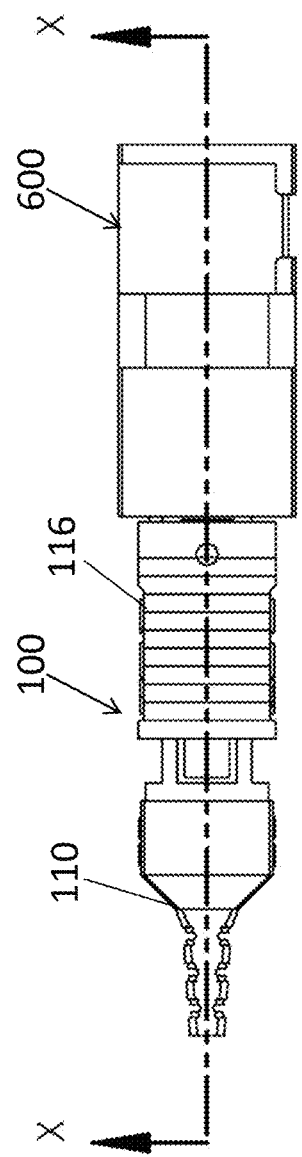
FIG. 10 is a side view of the prior art MPO connector of FIG. 2 coupled to the prior art adapter of FIG. 6.

A side view of the prior art MPO connector 100 coupled to the adapter 600 is shown in FIG. 10. FIGS. 11A and 11B show cross-sectional views of the MPO connector 100 and the adapter 600 along Section X-X shown in FIG. 10, just prior to latching. FIG. 11B shows a zoomed portion enclosed within the circle 1100 of FIG. 11A. Specifically, FIG. 11B shows an MPO adapter catch 604 within the housing 602 of the MPO adapter 600, and a recess 118 of the connector 100 just prior to latching. As the MPO connector 100 travels into the MPO adapter 600, the catches of the adapter, including catch 604, flex outward. With the catches opened, the catches push back the outer sliding housing 116 which is spring loaded, and engage the recesses, including recess 118, of the MPO connector 100.

Figures 12A, 12B:
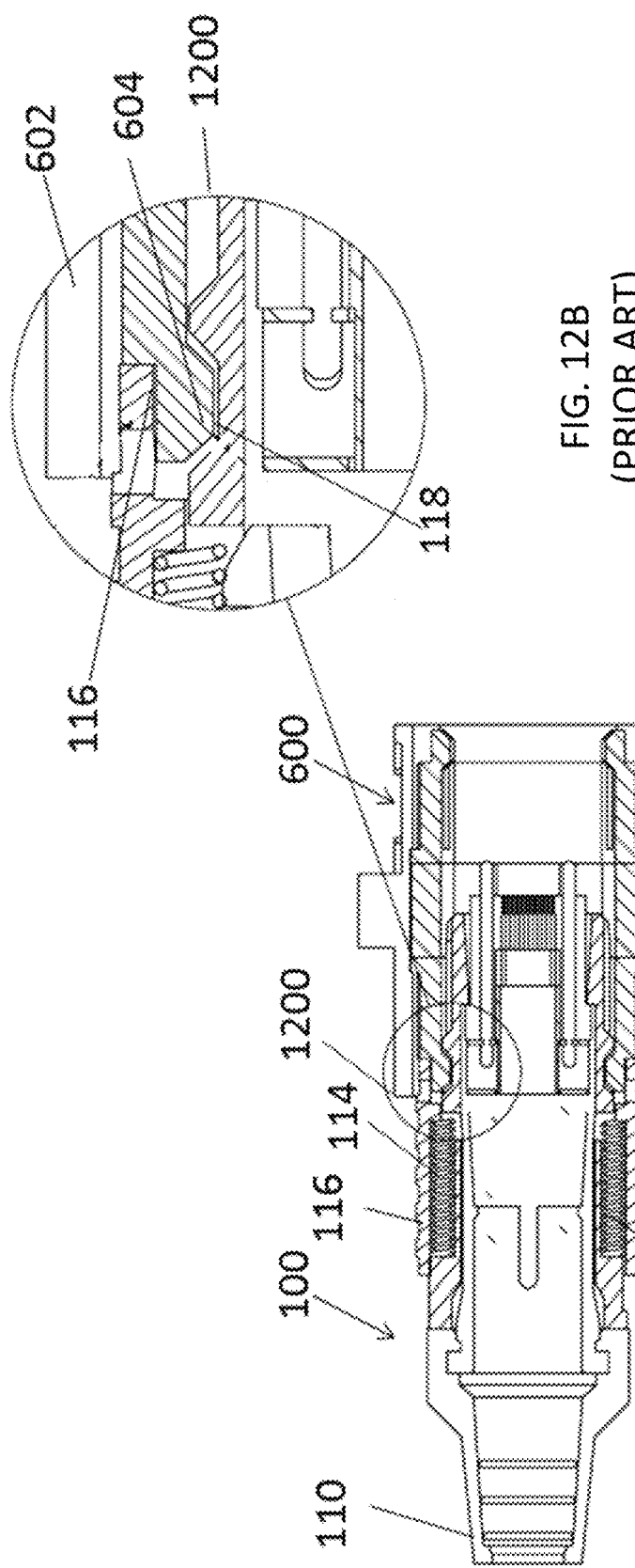
FIGS. 12A and 12B are cross-sectional views of the coupled prior art MPO connector and adapter of FIG. 11A in a latched position.

FIGS. 12A and 12B show cross-sectional views of the MPO connector 100 and the adapter 600 along Section X-X shown in FIG. 10, after latching. FIG. 12B shows a zoomed portion enclosed within the circle 1200 of FIG. 12A. Specifically, FIG. 12B shows that the MPO adapter catch 604 within the housing 602 of the MPO adapter 600 has engaged the recess 118 of the connector 100. The sliding outer housing 116 has been pushed forward by the springs 112 and 114 as shown in FIG. 12A.

Figure 13:
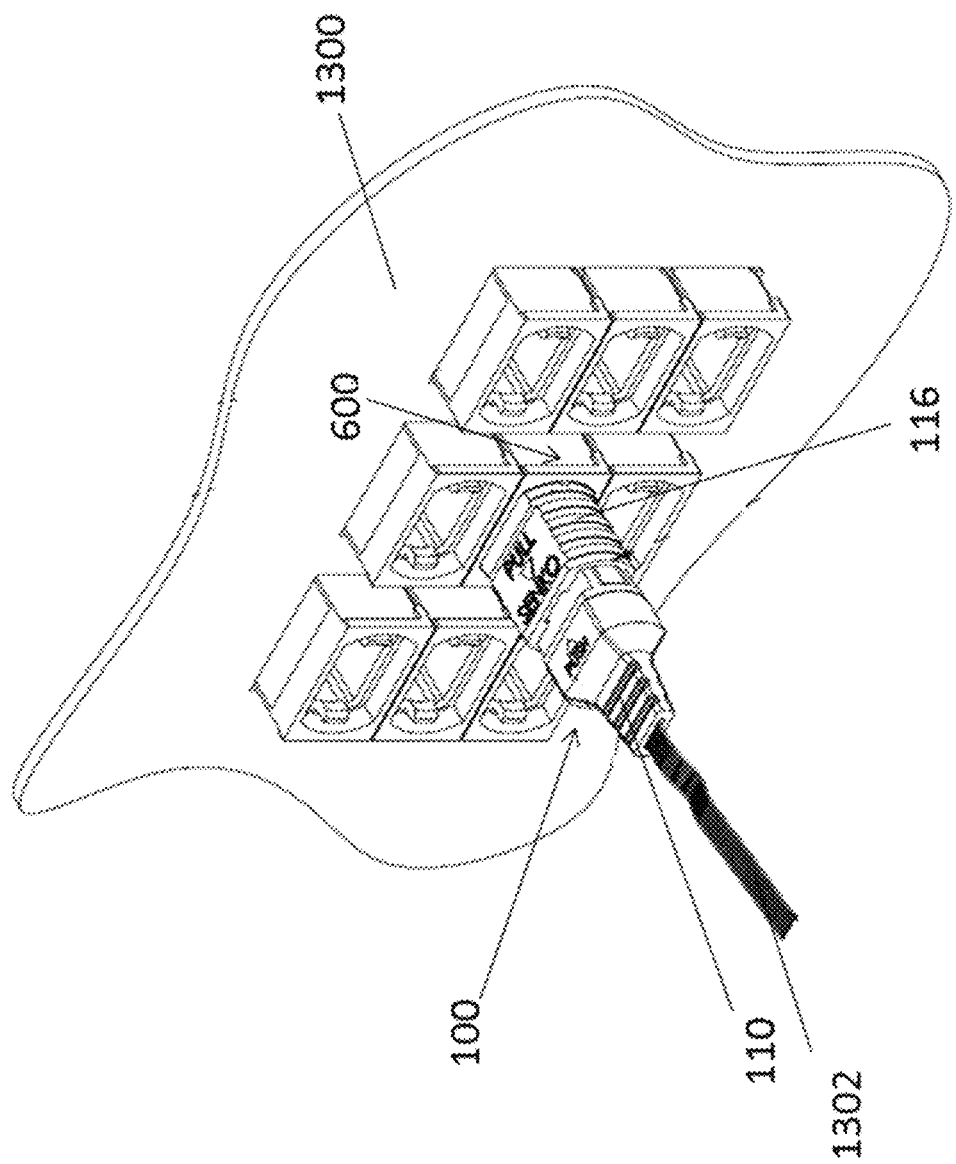
FIG. 13 is a perspective view of the prior art MPO connector of FIG. 2 coupled to an adapter disposed on a panel of adapters.
Figure 14:
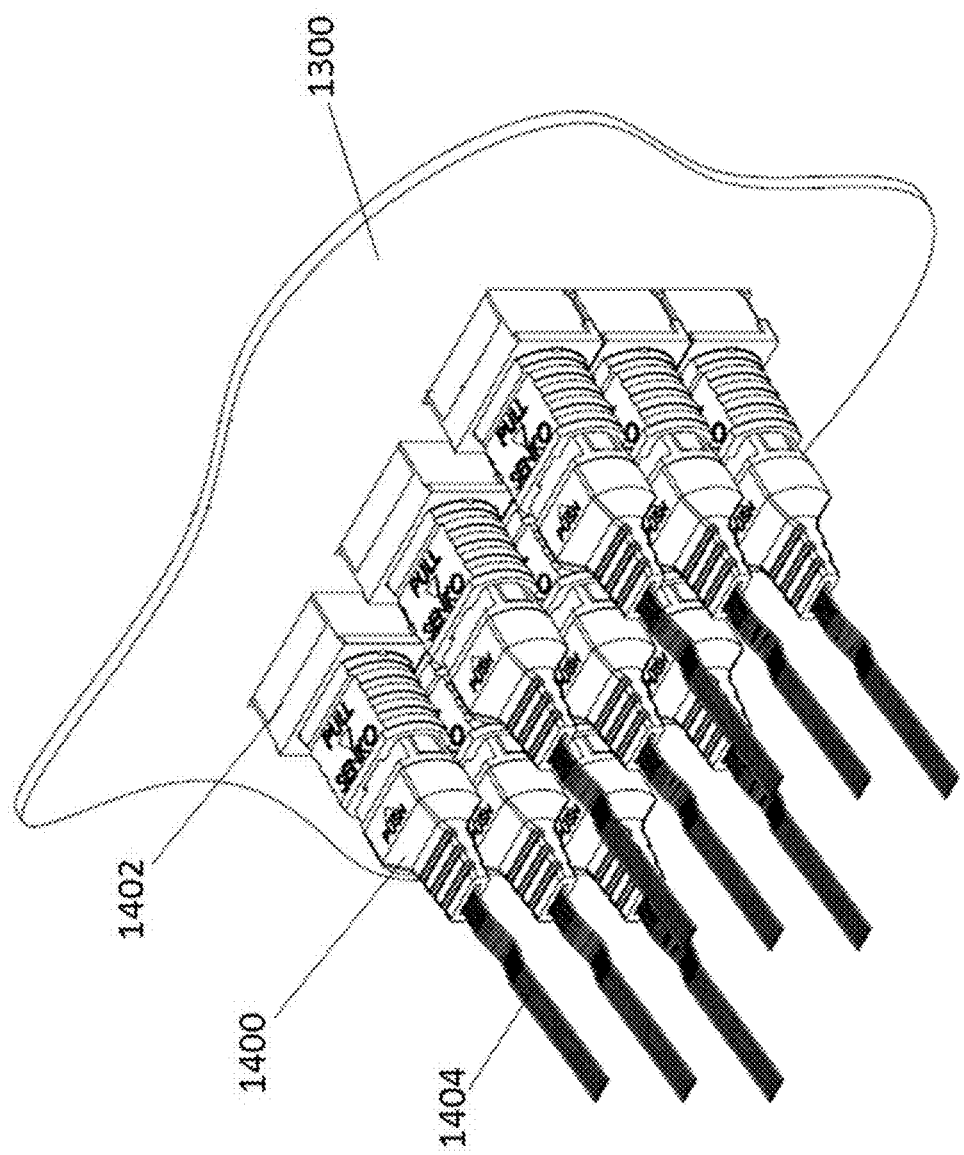
FIG. 14 is a perspective view of a plurality of prior art MPO connectors coupled to adapters on a high density panel, creating access issues.

Connectors may need to couple to adapters placed in high density panels. For example, FIG. 13 shows the MPO connector 100 coupled to the adapter 600 disposed in a panel 1300 having a plurality of MPO adapters. The connector 100 has a multi-fiber ribbon 1302. The MPO adapter 100 is inserted into the adapter 600 by pushing in while holding the strain relief 110 by hand. The MPO connector 100 is removed from the panel adapter 600 by pulling back the sliding outer housing 116 by hand. FIG. 14 shows additional conventional MPO connectors 1400 coupled to adapters 1402 on the high density panel 1300, creating problems for access to any MPO connector located in the middle of the MPO adapter field. Reaching into the middle of the field of adapters to remove an MPO connector is impossible to accomplish by hand without damage or disruption to adjacent MPO connectors and delicate ribbon fibers 1404.

Aspects of the present disclosure are directed to addressing the shortcomings of the conventional MPO connectors described in relation with FIGS. 1 to 14. Various embodiments disclosed herein provide connectors that are shorter than the conventional connectors and have less components, thereby being both cost efficient and capable of use in tight spaces. Moreover, various embodiments may be compatible with existing adapters, such as the MPO adapters described in relation with FIGS. 6 to 8.

Figure 15:
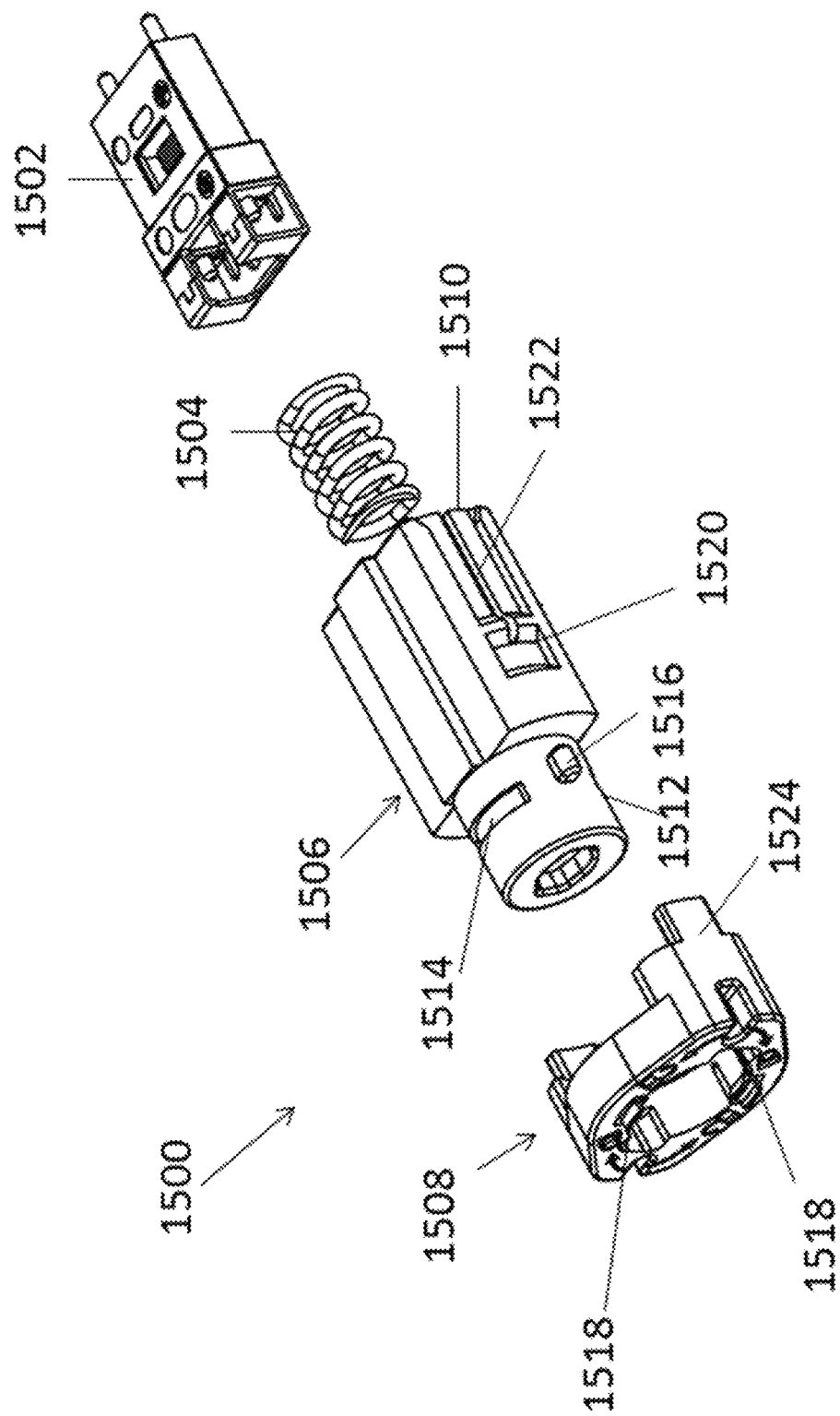
FIG. 15 is an exploded view of one embodiment of a connector according to aspects of the present disclosure.

FIG. 15 shows one embodiment of a connector 1500 according to aspects of the present disclosure. The connector 1500 includes an MPO ferrule assembly 1502, a ferrule spring 1504, a main body or housing 1506 and a lock 1508. Connectors disclosed herein may include less components compared to conventional MPO connectors. For example, the connector 1500 includes four components, less than the eight components of known MPO connectors as shown in FIG. 1. In various embodiments, a connector may include an MPO connector or an MT/MPO connector. For example, the ferrule may be an MT ferrule, whereas the ferrule assembly may be an MPO ferrule assembly. Although the ferrule assembly 1502 shown in FIG. 15 is a male ferrule assembly, various embodiments disclosed herein may include a female ferrule assembly.

In one embodiment, the housing may include a front portion and a rear portion. The rear portion may be cylindrically shaped. For example, as shown in FIG. 15, the housing 1506 includes a front portion 1510 and a cylindrical rear portion 1512. The housing 1506 may be configured to receive the ferrule assembly 1502 from the front portion 1510 of the housing. This is in contrast with the conventional MPO connectors, where the ferrule is received from the rear portion of the inner housing. For example, in FIG. 1, the inner housing 102 is configured to receive the ferrule assembly 104 from the rear portion of the inner housing. An advantage of receiving the ferrule assembly through the front of the housing is that it allows the rear portion of the housing to accommodate a single locking and unlocking mechanism for the connector. Another advantage is the use of less components in the connector.

The housing 1506 is configured to receive both the ferrule spring 1504 and the ferrule assembly 1502 through the front portion 1510. The ferrule spring 1504 and the ferrule assembly may be common parts used in conventional MPO connectors. In other embodiments, the ferrule assembly or the ferrule spring may be new or different types than those used in conventional connectors.

Moreover, in one embodiment, as shown in FIG. 15, the cylindrical portion 1512 of the housing 1506 may be configured to couple to the lock 1508. The lock may be configured to rotate about the housing so as to lock and unlock the housing from an adapter corresponding to the ferrule assembly 1502. In this embodiment, the lock 1508 is a bayonet lock. In other embodiments, the lock may be of another type. In one embodiment, the lock may be a ring coupled to the housing by any other coupling means and configured to rotate about the housing so as to lock and unlock the housing from an adapter.

As shown in FIG. 15, the bayonet lock 1508 may be configured to couple to the cylindrical portion of the housing 1506. The housing 1506, and specifically the cylindrical portion 1512 in this embodiment, may have at least one groove 1514 and at least one stop 1516. Further, the lock 1508 may include at least one flexing tab 1518 configured to snap into the groove 1514 so as to couple the lock to the housing 1506. The stop 1516 may be disposed on the housing 1506 so as to limit rotation of the lock 1508.

Various coupling mechanisms may be provided for coupling the connector to an adapter. For example, in one embodiment as shown in FIG. 15, the housing 1506 may have at least one recess 1520 configured to receive a respective catch of an adapter so as to couple the connector 1500 to the adapter. Moreover, the housing 1506 may have at least one slit 1522 to allow flexing of the housing. In some embodiments, as shown, the lock 1508 may also have at least one tab 1524 positioned so as to allow covering a respective recess 1520 of the housing, as well as a respective adapter catch, when the lock 1508 is in a locked position.

An assembled form of the connector 1500 is shown in FIG. 16. The length of the assembled MPO connector 1500 is about 18.5 mm. By contrast, as shown in FIG. 17, the prior art MPO connector 100 has a length of about 37 mm. Embodiments disclosed herein allow shorter length MPO connectors, for example, by using a single housing and a rotating mechanism that requires twisting to latch and unlatch. By contrast, conventional MPO connectors use multiple housing components and a sliding mechanism to latch and unlatch.

Figure 18:
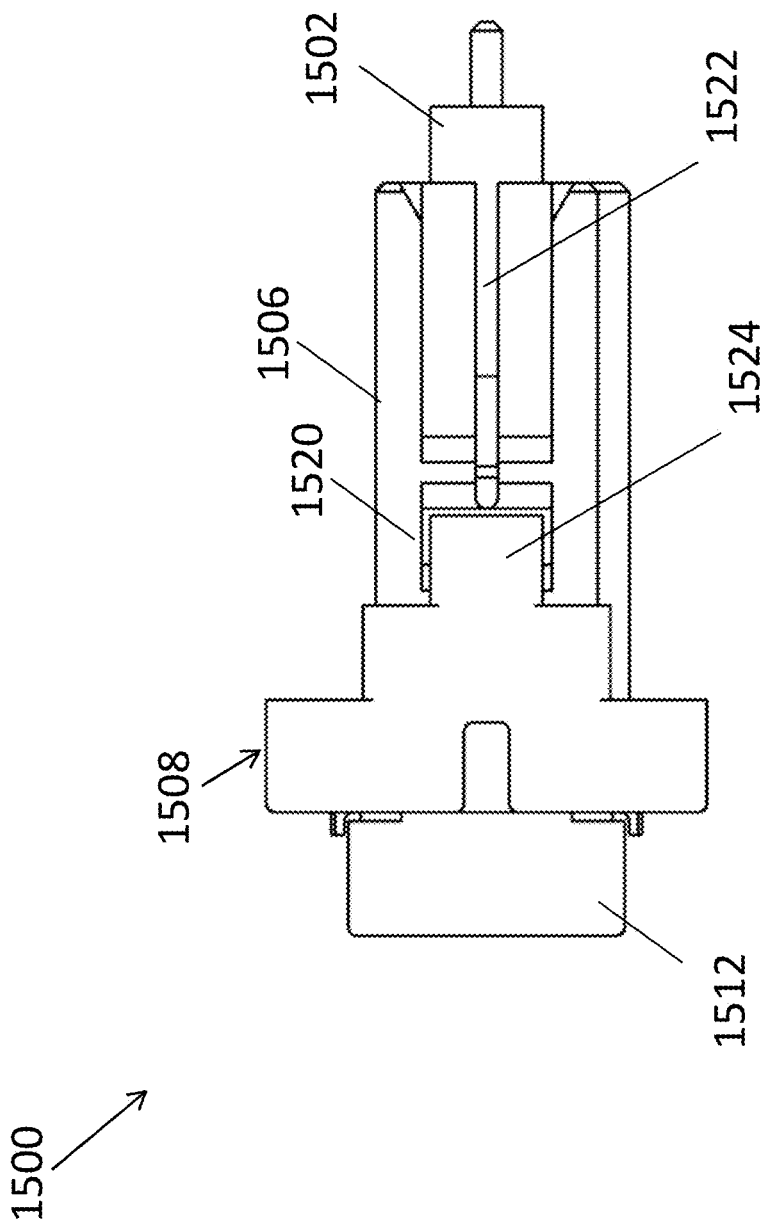
FIG. 18 is a side view of the connector of FIG. 16 according to aspects of the present disclosure.

FIG. 18 is a side view of the connector 1500, showing the housing 1506 having a slit 1522 and a recess 1520 covered by the tab 1524 of the lock 1508 disposed around the rear cylindrical portion 1512. The ferrule assembly 1502 is coupled to the housing 1506.

Figure 19:
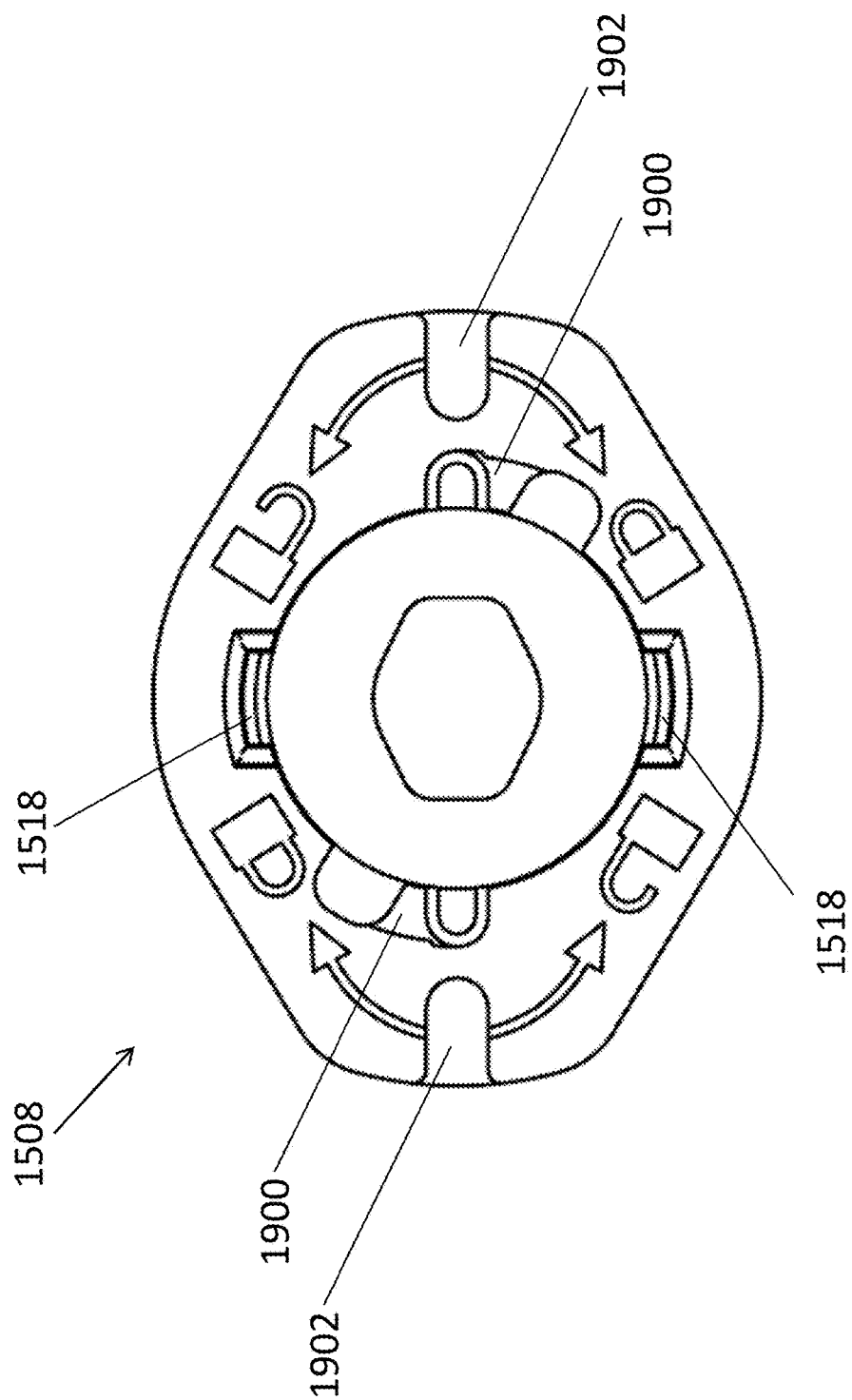
FIG. 19 is a front view of a bayonet lock according to aspects of the present disclosure.

In some embodiments of connectors disclosed herein, bayonet type locks may be provided. FIG. 19 is a front view of the bayonet lock 1508, showing two flexing tabs 1518 configured to snap into respective grooves of the housing. In some embodiments, the lock 1508 may have recesses 1900 configured to limit rotation of the lock in conjunction with stops disposed on the housing, such as the stop 1516 shown in FIG. 15. In some embodiments, the lock 1508 may also have recesses 1902 configured to receive a tool to facilitate rotation of the lock, especially when the connector is coupled to an adapter in a high density adapter panel. The arrows on the lock 1508 indicate lock and unlock directions.

Figure 20:
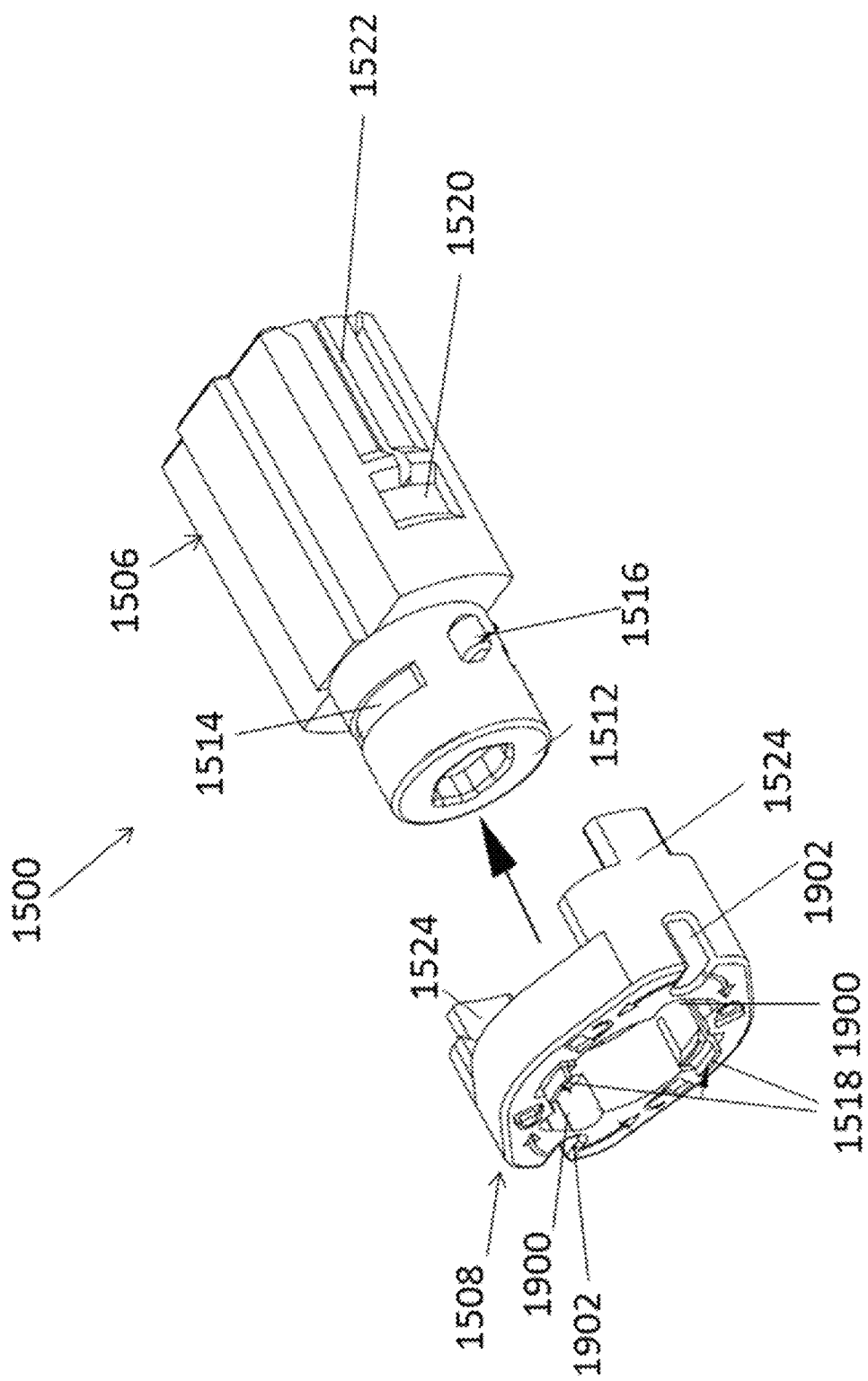
FIG. 20 is an exploded view of the connector of FIG. 16, showing the housing and lock according to aspects of the present disclosure.

FIG. 20 shows an exploded view of the connector 1500 including the housing 1506 and the bayonet lock 1508. The arrow indicates the direction of assembly of the lock with the housing. The housing 1506 may include slits 1522 and recesses 1520 on either side of the housing. The housing 1506 may also have stops 1516 on either side of the housing, and grooves 1514 at the top and bottom of the housing, disposed around the cylindrical portion 1512 so as to couple the lock 1508 to the housing. The stops 1516 are bumps on each side of the housing 1506, and configured to fit into recesses 1900 inside the bayonet lock 1508 to limit rotation and provide stops at the locked and unlocked positions of the bayonet lock.

As shown in FIG. 20, in some embodiments, the lock 1508 may have two flexing tabs 1518 arranged in positions corresponding to that of the two grooves 1514 of the housing 1506, and configured to engage the grooves to couple the lock to the housing. The lock 1508 may also have recesses 1900 configured to engage the stops 1516 to limit rotation of the lock. Moreover, the lock 1508 may have recesses 1902 configured to receive a portion of a tool to rotate the lock. Finally, the lock 1508 may have two tabs 1524 on either side of the lock, positioned to correspond to the locations of the recesses 1520 of the housing 1506 to allow covering the recesses and respective catches of an adapter coupled to the connector 1500. In other embodiments, the lock may be configured to include a different number or arrangement of flexing tabs, recesses for stops, recesses for a locking and unlocking tool, and tabs to facilitate coupling and decoupling the connector to and from an adapter.

Figure 21:
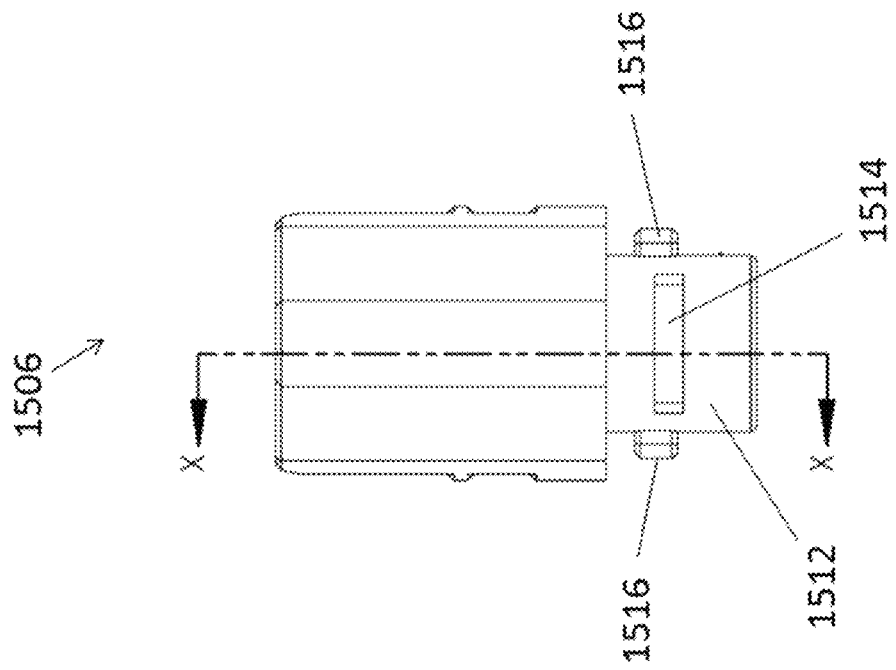
FIG. 21 is a side view of the housing of FIG. 16, showing a slit to allow flexing according to aspects of the present disclosure.
Figure 22:
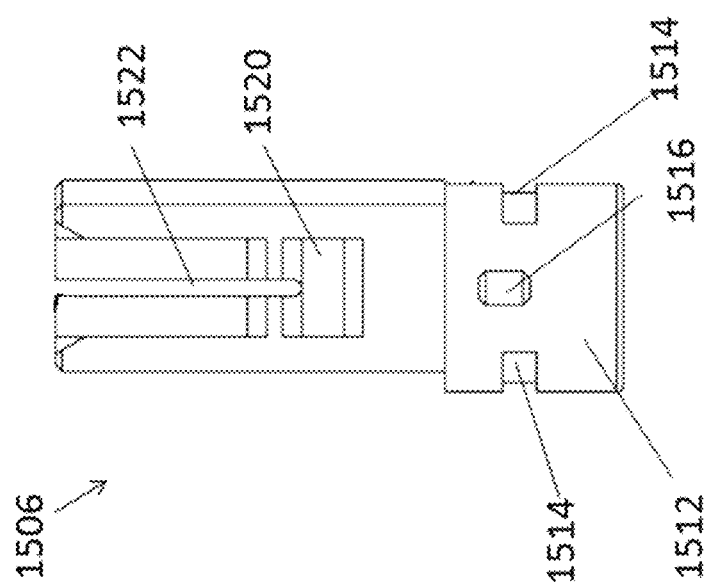
FIG. 22 is a top view of the housing of FIG. 21, showing a groove and a plurality of stops according to aspects of the present disclosure.

FIG. 21 is a side view of the housing 1506, showing the slit 1522, the recess 1520, the stop 1516 and the two grooves 1514. In this embodiment, the housing is symmetrical, such that the other side of the housing is identical to the side shown in FIG. 21. However, in other embodiments, the housing need not be symmetrical, and various features discloses herein may be arranged in different configurations. FIG. 22 shows a top view of the housing 1506, showing the top groove 1514 and a two stops 1516 on the sides of the housing, specifically positioned on the cylindrical portion 1512 that is configured to couple with a lock.

Figure 24:
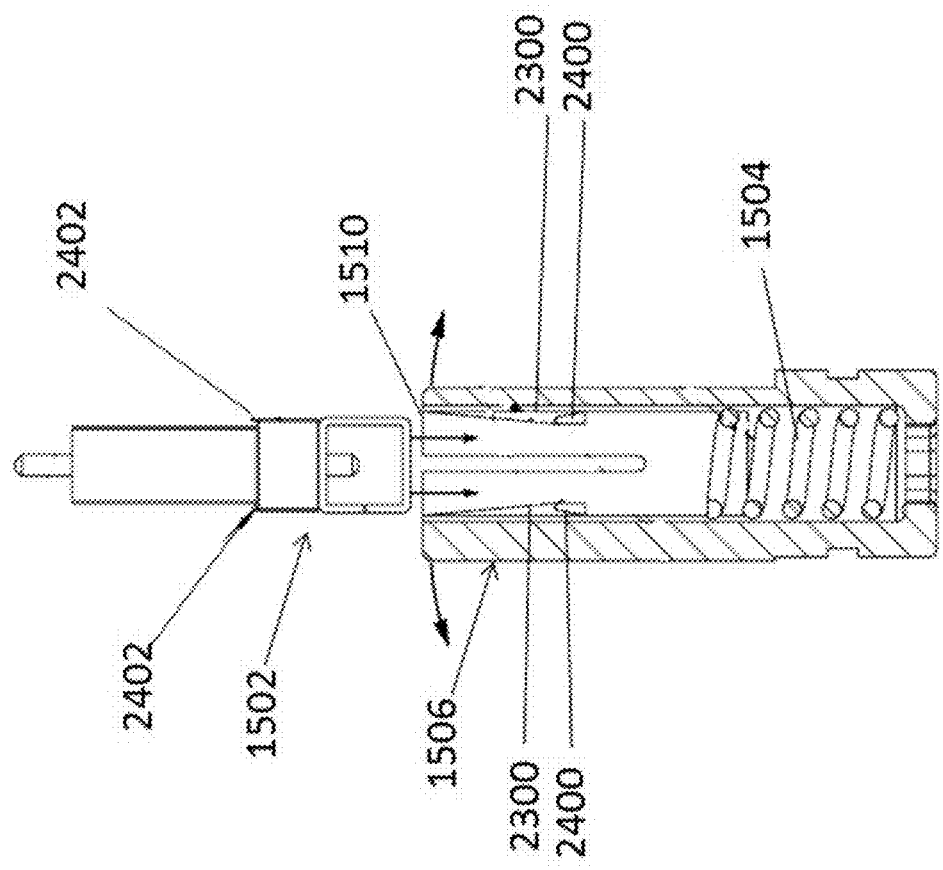
FIG. 24 is a cross-sectional view of the housing of FIG. 21 being coupled to a ferrule assembly, showing a ferrule spring and a plurality of inclined surfaces of the housing according to aspects of the present disclosure.
Figure 23:
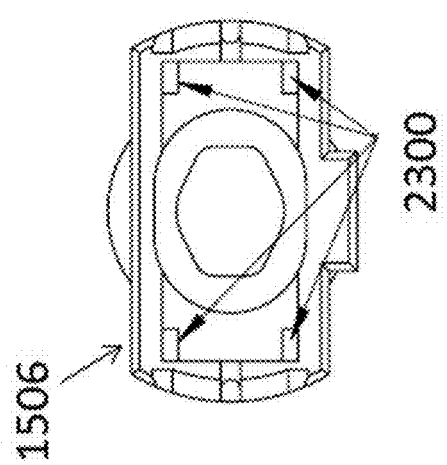
FIG. 23 is a front view of the housing of FIG. 21 according to aspects of the present disclosure.

FIGS. 23 and 24 illustrate one embodiment of the interior of the housing 1506. FIG. 23 shows a front view through the housing 1506, illustrating one embodiment wherein the housing includes inclined surfaces 2300 within the housing. FIG. 24 also shows the inclined surfaces 2300 configured to facilitate coupling of the ferrule assembly 1502 to the housing 1506. The cross-sectional view of the housing in FIG. 24 also shows that the housing may accommodate the ferrule spring 1504 disposed within the housing, and may also include a plurality of catches 2400 configured to engage the ferrule assembly 1502. The ferrule assembly 1502 may be inserted into the housing 1506 through a front portion 1510 of the housing. The ferrule assembly 1502 may include a plurality of corners 2402 which engage the catches 2400. Thus, the ferrule assembly 1502 may be secured to the housing 1506 between the ferrule spring 1504 and the catches 2400.

The bayonet lock 1508 is shown in an unlocked position in FIG. 25A, and in a locked position in FIG. 26A. During operation of one embodiment, the connector is pushed by the bayonet lock into an adapter, following by a $\frac{1}{12}^{th}$ rotational twist to latch and lock the connector to the adapter. The reverse is done to unlatch and unlock the connector from the adapter. In some embodiments, the lock may be configured so as to make a clicking noise and/or provide another form of feedback to the user when twisting the lock. This will allow the user to more conveniently recognize the switch between locked and unlocked states of the connector. In one embodiment, when the bayonet lock 1508 is in an unlocked position, as shown in FIG. 25B, the recesses 1520 of the housing may be uncovered. On the other hand, when the bayonet lock 1508 is in a locked position, as shown in FIG. 26B, the tabs 1524 of the lock may cover the recesses 1520 of the housing, as well as the catches of the adapter coupled to the recesses.

Figure 27:
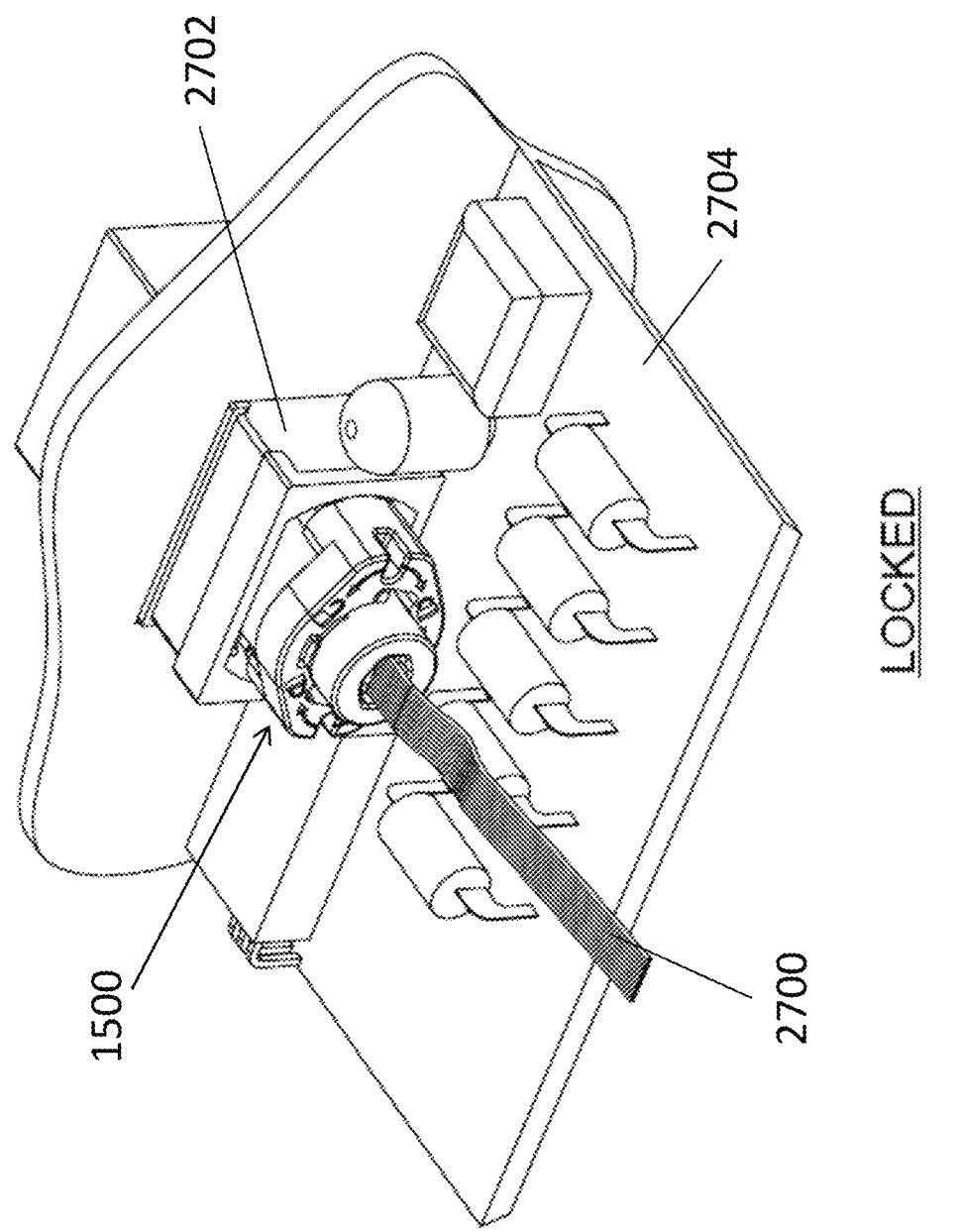
FIG. 27 is a perspective view of a locked connector coupled to an adapter positioned near a circuit board according to aspects of the present disclosure.
Figure 28:
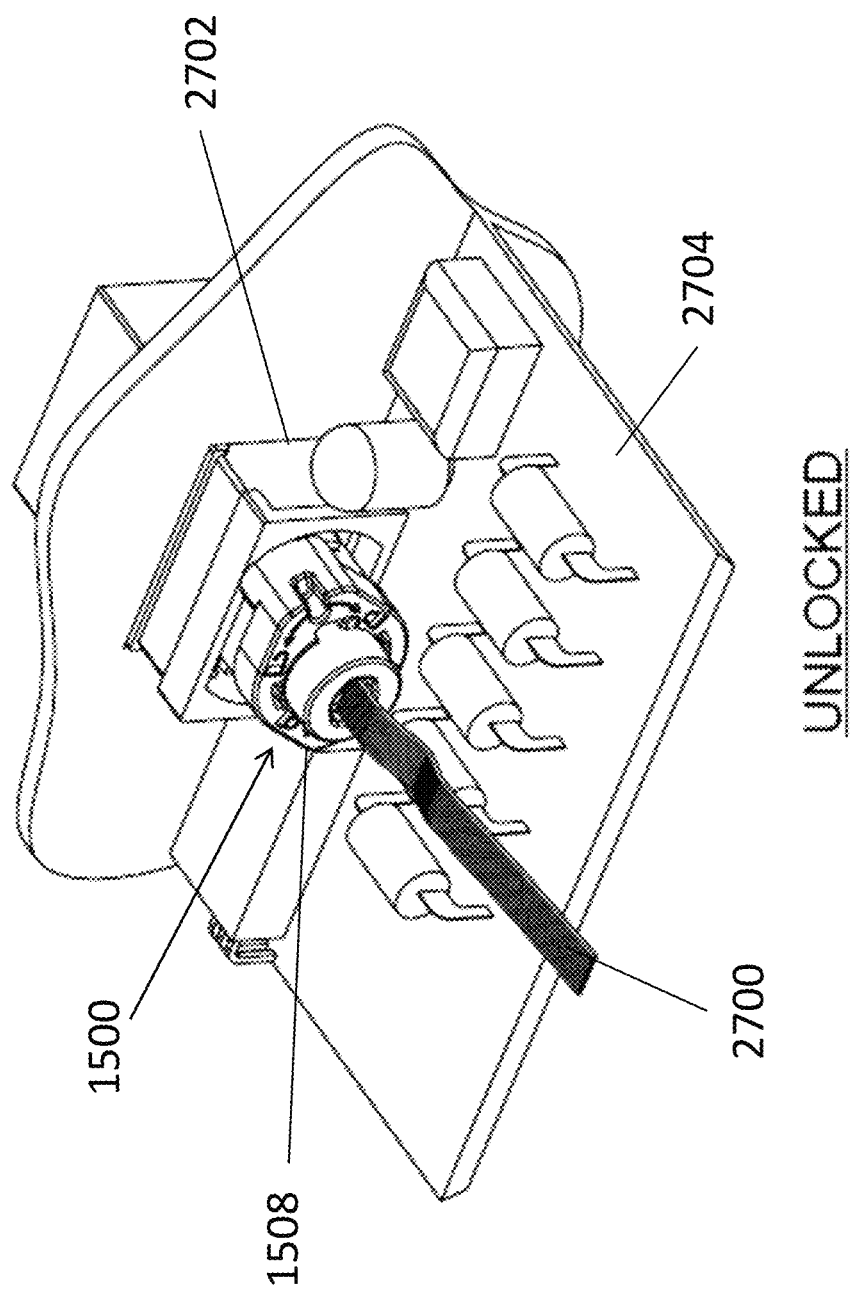
FIG. 28 is a perspective view of the connector of FIG. 27 in an unlocked position and coupled to an adapter positioned near a circuit board according to aspects of the present disclosure.

The connector 1500 may be coupled to an adapter positioned on a panel or inside a device or module, or close to a circuit board. For example, FIG. 27 shows the connector 1500 having a ribbon fiber 2700. Ribbon fibers may be delicate, requiring careful handling. For example, as shown in FIG. 27, the connector 1500 is coupled to an adapter 2702 positioned near a circuit board 2704. The compact size and shorter length of the connector 1500 requires less space inside a device or module, a benefit when positioned to circuit boards. The connector 1500 is shown to be in a locked position in FIG. 27. The same connector 1500 is shown in an unlocked position in FIG. 28. The bayonet lock 1508 is shown to be twisted relative to the locked position in FIG. 27. In one embodiment, when the connector is coupled to an adapter as shown for example in FIGS. 27 and 28, the portion of the connector protruding from the adapter may have a length less than or equal to about 7.5 mm. In other embodiments, the length of the protruding portion may be less than that of a conventional connector, e.g. less than about 26 mm.

Figure 29A:
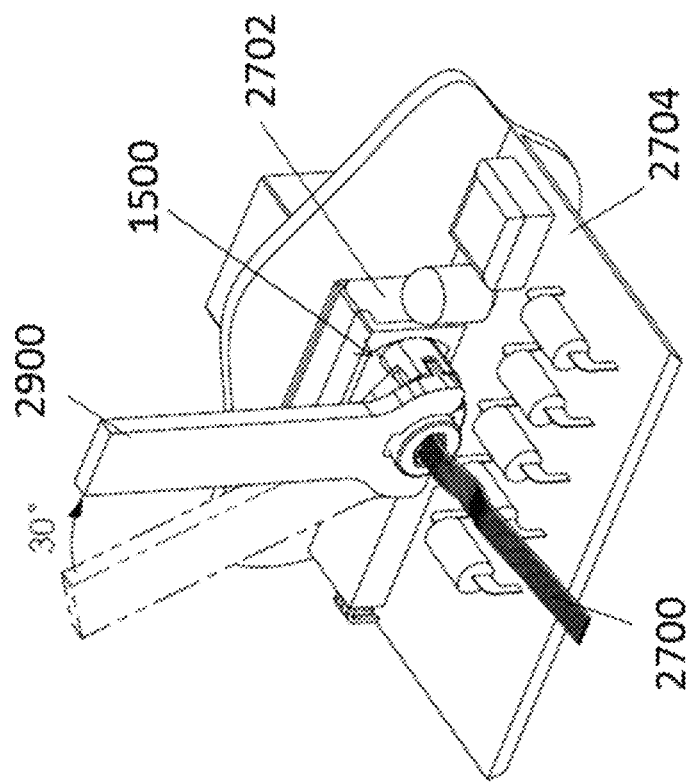
FIGS. 29A and 29B are perspective views of the connector of FIG. 27 coupled to an adapter positioned near a circuit board, showing the use of tool for locking and unlocking the connector according to aspects of the present disclosure.

Various embodiments of connectors disclosed herein may be configured to allow locking and unlocking using tools. FIG. 29A shows a tool 2900, such as a wrench, in an unlocked position of the connector 1500, and FIG. 29B shows the same tool moved to a locked position, thereby locking the connector to the adapter 2702.

Figure 29B:
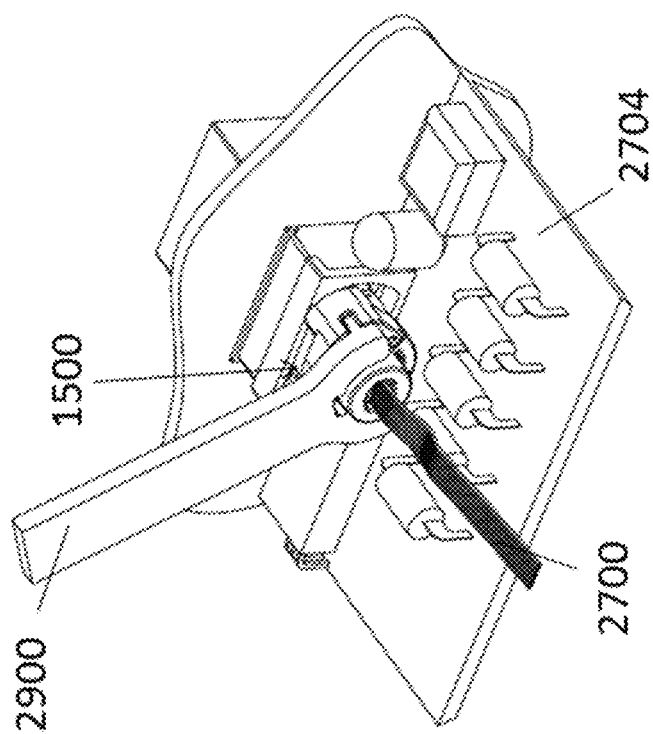
Figure 30:
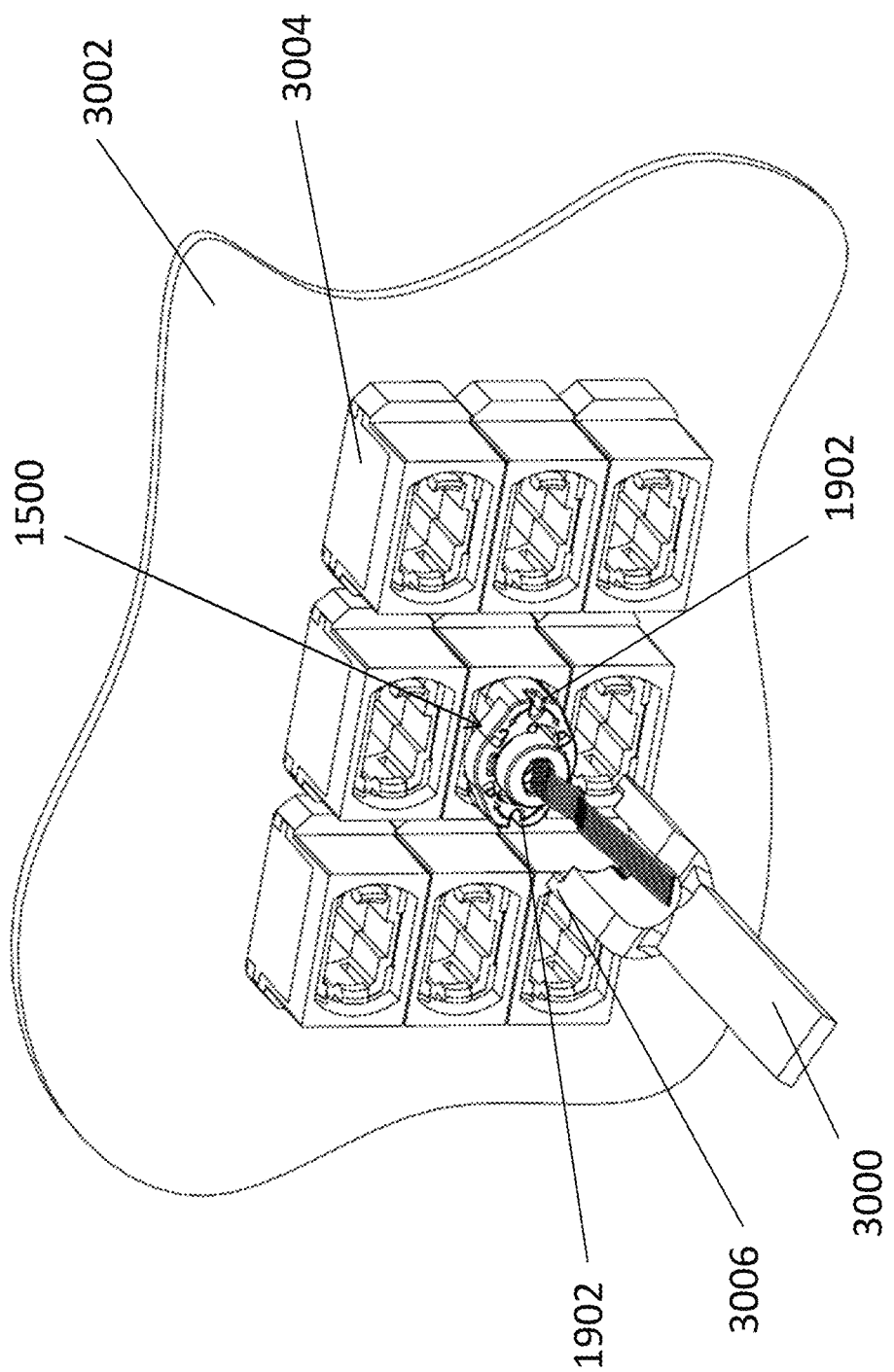
FIG. 30 is a perspective view of a connector coupled to an adapter in a high density panel, showing the use of a tool for axially locking and unlocking the connector according to aspects of the present disclosure.

In some embodiments where adapters are positioned in high density panels or delicate spaces, locking or unlocking using a tool positioned in a transverse plane of the connector, as shown in FIGS. 29A and 29B, may not be feasible. In such cases, a tool, such as tool 3000 shown in FIG. 30, positioned along the longitudinal axial direction of the connector 1500 may allow access to the high density panel 3002 having a plurality of adapters 3004 arranged in close proximity. Accordingly, the connector may be configured with recesses 1902, as shown and described for example in relation with FIG. 19. The recesses 1902 may be configured to receive respective keys 3006 of the tool 3000, thereby allowing convenient manipulation of the connector 1500, even in high density spaces.

Various embodiments disclosed herein are compatible with known MPO adapters, and may also be configured for compatibility with new types of adapters. The adapters may be configured to be fastened to a chassis, bulkhead, panel, or any type of enclosure structure. Various embodiments may be configured with alternative types of coupling mechanisms than those described herein, for coupling the connectors to the adapters, for coupling the ferrule assemblies to the housing or for coupling the lock to the housing. Coupling mechanisms may include, for example, a threaded configuration, or a clip-type attachment.

Assembly of connectors disclosed herein may be simpler than that of conventional MT/MPO connectors, at least due to the reduced number of components and the shorter length of the connectors. Manufacturing costs can be reduced as fewer different parts need to be designed, tooled and constructed, and inventories of parts can also be minimized.

In external applications wherein the adapters and connectors may be exposed to weather, particularly rain or moisture in general, the connectors may be configured as ingress protection (IP) connectors that are waterproof. A standard for such connectors may be an OVDA connector. For weatherproof or waterproof installations, the connectors may include protective housings and seals to inhibit water penetration, and may include different levels of 'ingress protection' depending on the environment to which they will be exposed.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector comprising:
a ferrule assembly;
a housing configured to be received by an adapter external to the housing, the housing having a front portion and a rear portion, the front portion being configured to receive the ferrule assembly and the rear portion being configured to couple to the adapter;
a lock coupled to the rear portion of the housing and configured to rotate so as to lock and unlock the housing from said adapter; and
a ferrule spring disposed within the housing, wherein the housing includes at least one catch and the ferrule assembly is secured to the housing between the ferrule spring and the at least one catch.

2. The connector of claim 1, wherein the ferrule assembly is one of an MT/MPO ferrule assembly and an MPO ferrule assembly.

3. The connector of claim 1, wherein the lock is a ring configured to rotate about the housing.

4. The connector of claim 1, wherein the lock is a bayonet lock.

5. The connector of claim 4, wherein the housing includes a cylindrical portion and the bayonet lock is disposed about the cylindrical portion.

6. The connector of claim 1, the housing being the only housing of said connector.

7. The connector of claim 1, wherein the lock includes at least one flexing tab configured to snap into a respective groove of the housing so as to couple the lock to the housing.

8. The connector of claim 1, wherein the housing includes a stop configured to limit rotation of the lock.

9. The connector of claim 1, wherein the housing further comprises a plurality of inclined surfaces configured to facilitate coupling of the ferrule assembly to the housing.

10. The connector of claim 1, wherein the housing includes a plurality of slits configured to allow flexing of the housing.

11. The connector of claim 1, wherein the housing includes at least one recess configured to receive a respective catch of said adapter.

12. The connector of claim 11, wherein the lock includes at least one tab configured to cover the respective catch of said adapter disposed in the at least one recess of the housing when the lock is in a locked position.

13. The connector of claim 12, wherein the at least one tab is configured to uncover the respective catch of said adapter disposed in the at least one recess of the housing when the lock is in an unlocked position, to allow decoupling the housing from the adapter.

14. The connector of claim 1, having a connector length less than about 37 mm.

15. The connector of claim 14, wherein the connector length is less than or equal to about 18.5 mm.

16. The connector of claim 1, wherein the housing is coupled to said adapter, a portion of the connector protruding from said adapter having a length less than or equal to about 7.5 mm.

17. A connector comprising:
a housing configured to be received by an adapter external to the housing, the housing having a front portion and a rear portion opposite the front portion, the front portion being configured to receive a ferrule assembly, and the rear portion being configured to couple to the adapter;
a lock coupled to the rear portion of the housing and configured to rotate around the housing so as to lock and unlock the housing from said adapter; and
a ferrule spring disposed within the housing, wherein the housing includes at least one catch and the ferrule assembly is secured to the housing between the ferrule spring and the at least one catch.

18. The connector of claim 17, wherein the housing is configured to receive one of an MT/MPO ferrule assembly and an MPO ferrule assembly, and to couple to an MPO adapter.

19. The connector of claim 17, wherein the lock is a bayonet lock.

20. The connector of claim 17, having a connector length less than or equal to about 18.5 mm.

\* \* \* \* \*